United States Patent
Werner et al.

(10) Patent No.: US 6,314,134 B1
(45) Date of Patent: Nov. 6, 2001

(54) BLIND EQUALIZATION ALGORITHM WITH JOINT USE OF THE CONSTANT MODULUS ALGORITHM AND THE MULTIMODULUS ALGORITHM

(75) Inventors: Jean-Jacques Werner, Holmdel; Jian Yang, Marlboro, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/066,189

(22) Filed: Apr. 24, 1998

(51) Int. Cl.[7] .................................................. H03H 7/30
(52) U.S. Cl. ......................... 375/232; 375/350; 708/323
(58) Field of Search ................................. 375/232, 346 T, 375/229, 233, 234, 235, 236, 350; 348/607; 714/708; 708/323

(56) References Cited

U.S. PATENT DOCUMENTS

| | | | |
|---|---|---|---|
| 5,311,546 | * 5/1994 | Paik et al. | 375/233 |
| 5,432,794 | * 7/1995 | Yaguchi | 714/708 |
| 5,502,506 | * 3/1996 | Choi | 348/607 |
| 5,539,774 | * 7/1996 | Nobakht et al. | 375/232 |
| 5,909,466 | * 6/1999 | Labat et al. | 375/233 |

* cited by examiner

Primary Examiner—Don N. Vo
(74) Attorney, Agent, or Firm—J. Opalach

(57) ABSTRACT

A receiver, comprising an adaptive filter, performs blind equalization using a joint constant modulus algorithm—multimodulus algorithm (CMA-MMA) blind equalization algorithm. The adaptive filter is a two-filter structure. The receiver performs CMA-MMA blind equalization using asymmetric algorithms. This joint CMA-MMA blind equalization technique reduces the rate of occurrence of a diagonal solution.

17 Claims, 4 Drawing Sheets

IN-PHASE CONTOUR

QUADRATURE PHASE CONTOURS

BLIND EQUALIZATION ALGORITHM WITH JOINT USE OF THE CONSTANT MODULUS ALGORITHM AND THE MULTIMODULUS ALGORITHM

CROSS-REFERENCE TO RELATED APPLICATIONS

Related subject matter is disclosed in the co-pending, commonly assigned, U.S. patent applications of: Werner et al., entitled "Technique for Improving the Blind Convergence of a Two-Filter Adaptive Equalizer," Ser. No. 08/717,582, filed on Sep. 18, 1996; and Werner et al., entitled "Technique for Improving the Blind Convergence of an Adaptive Equalizer Using a Transition Algorithm," Ser. No. 08/744,908, filed on Nov. 8, 1996.

FIELD OF THE INVENTION

The present invention relates to communications equipment, and, more particularly, to blind equalization in a receiver.

BACKGROUND OF THE INVENTION

In blind equalization, the adaptive filters of a receiver are converged without the use of a training signal. As known in the art, there are two techniques for blind equalization: one is referred to herein as the "reduced constellation algorithm" (RCA) (e.g., see Y. Sato, "A Method of Self-Recovering Equalization for Multilevel Amplitude-Modulation Systems," *IEEE Trans. Commun.*, pp. 679–682, Jun. 1975; and U.S. Pat. No. 4,227,152, issued Oct. 7, 1980 to Godard); and the other technique is the so-called "constant modulus algorithm" (CMA) (e.g., see D. N. Godard, "Self-Recovering Equalization and Carrier Tracking in Two-Dimensional Data Communications Systems," *IEEE Trans. Commun.*, vol. 28, no. 11, pp. 1867–1875, November 1980; and N. K. Jablon, "Joint Blind Equalization, Carrier Recovery, and Timing Recovery for High-Order QAM Signal Constellations", *IEEE Trans. Signal Processing*, vol. 40, no. 6, pp. 1383–1398, 1992.) Further, the co-pending, commonly assigned, U.S. Patent application of Werner et al., entitled "Blind Equalization," Ser. No. 08/646404, filed on May 7, 1996, presents an new blind equalization technique—the multimodulus algorithm (MMA)—as an alternative to the above-mentioned RCA and CMA approaches.

However, for all blind equalization approaches the most fundamental performance issue is the ability to achieve reliable initial convergence—else the adaptive filter may converge to a wrong solution such as the well-known "diagonal solution."

Generally speaking, the RCA algorithm has less reliable convergence than either the CMA or MMA algorithms. As between the CMA and MMA algorithms, these algorithms have both benefits and drawbacks. For example, the CMA algorithm provides more reliable convergence—thus avoiding incorrect diagonal solutions—but the CMA algorithm requires an expensive rotator. In comparison, the MMA algorithm does not require an expensive rotator but is more susceptible than the CMA algorithm to incorrect convergence.

The U.S. Patent applications of: Werner et al., present alternative techniques for use in preventing diagonal solutions. The Werner et al. U.S. Patent application entitled "Technique for Improving the Blind Convergence of a Two-Filter Adaptive Equalizer," Ser. No. 08/717,582, filed on Sep. 18, 1996, presents a blind equalization algorithm referred to as the constrained Hilbert cost function (CHCF). The CHCF algorithm uses the Hilbert transfer function and dot-product properties of the in-phase and quadrature filters to prevent the occurrence of diagonal solutions. The Werner et al. U.S. Patent application entitled "Technique for Improving the Blind Convergence of an Adaptive Equalizer Using a Transition Algorithm," Ser. No. 08/744,908, filed on Nov. 8, 1996, presents a blind equalization technique algorithm referred to as the transition algorithm. In the latter, generally speaking, an adaptive filter first uses the CMA algorithm and then switches to using the MMA algorithm.

SUMMARY OF THE INVENTION

We have discovered another technique for use in blind equalization of an adaptive equalizer that reduces the rate of occurrence of a diagonal solution. In particular, and in accordance with the invention, a receiver performs blind equalization using a joint CMA-MMA blind equalization algorithm.

In an embodiment of the invention, a receiver comprises an adaptive filter having a two-filter structure. The receiver performs CMA-MMA blind equalization using asymmetric algorithms.

DETAILED DESCRIPTION

Figure 1:
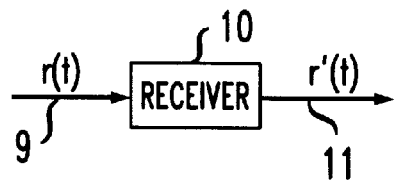
FIG. 1 is an illustrative block diagram of a portion of a communications system embodying the principles of the invention.

An illustrative high-level block diagram of a portion of a communications system embodying the principles of the invention is shown in FIG. 1. For illustrative purposes only, it is assumed that receiver 10 receives a CAP (carrierless, amplitude modulation, phase modulation) signal, which can be represented by:

$$r(t) = \sum_n [a_n p(t-nT) - b_n \tilde{p}(t-nT)] + \xi(t) \quad (1)$$

where $a_n$ and $b_n$ are discrete-valued multilevel symbols, $p(t)$ and $\tilde{p}(t)$ are impulse responses which form a Hilbert pair, $T$ is the symbol period, and $\xi(t)$ is additive noise introduced in the channel. (Additional information on a CAP communications system can be found in J. J. Werner, "Tutorial on Carrierless AM/PM—Part I—Fundamentals and Digital CAP Transmitter," Contribution to ANSI X3T9.5 TP/PMD Working Group, Minneapolis, Jun. 23, 1992.)

It is assumed that the CAP signal in equation (1) has been distorted while propagating through communications channel 9 and experiences intersymbol interference (ISI). This ISI consists of intrachannel ISI ($a_n$ or $b_n$ symbols interfering with each other) and interchannel ISI ($a_n$ and $b_n$ symbols interfering with each other). The purpose of receiver 10 is to remove the ISI and minimize the effect of the additive noise ξ(t) to provide signal r'(t). The inventive concept will illustratively be described in the context of a joint CMA and MMA blind equalization algorithm for use within receiver 10. However, before describing the inventive concept, some background information on adaptive filters and the above-mention CMA and MMA algorithms is presented. Also, as used herein, an adaptive filter is, e.g., a fractionally spaced linear equalizer, which is hereafter simply referred to as an FSLE equalizer or, simply, an equalizer.

Adaptive Filters, CMA and MMA

Figure 2:
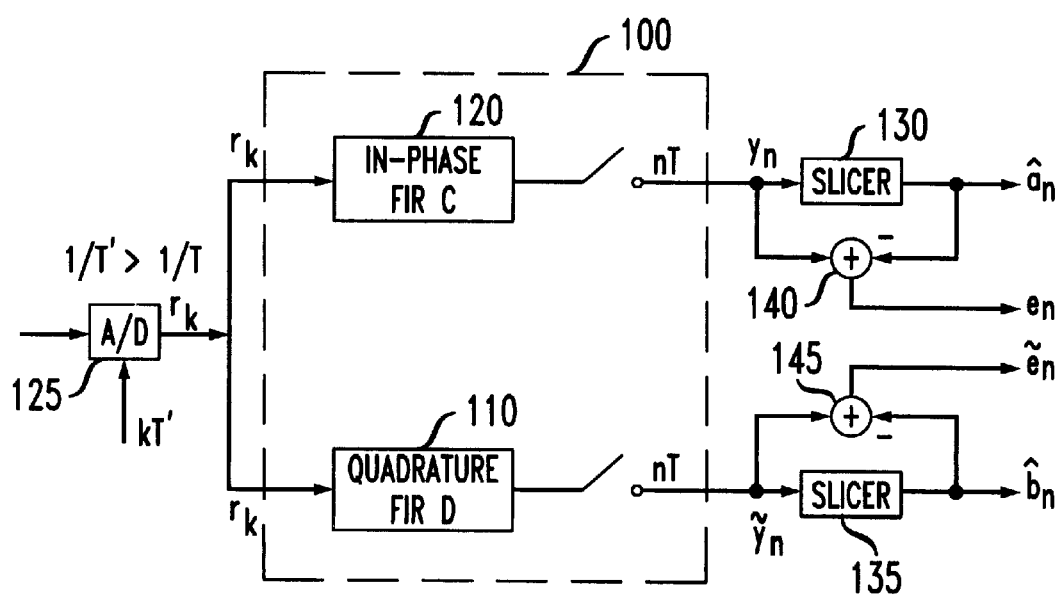
FIG. 2 is an illustrative block diagram of a phase-splitting equalizer.
Figure 3:
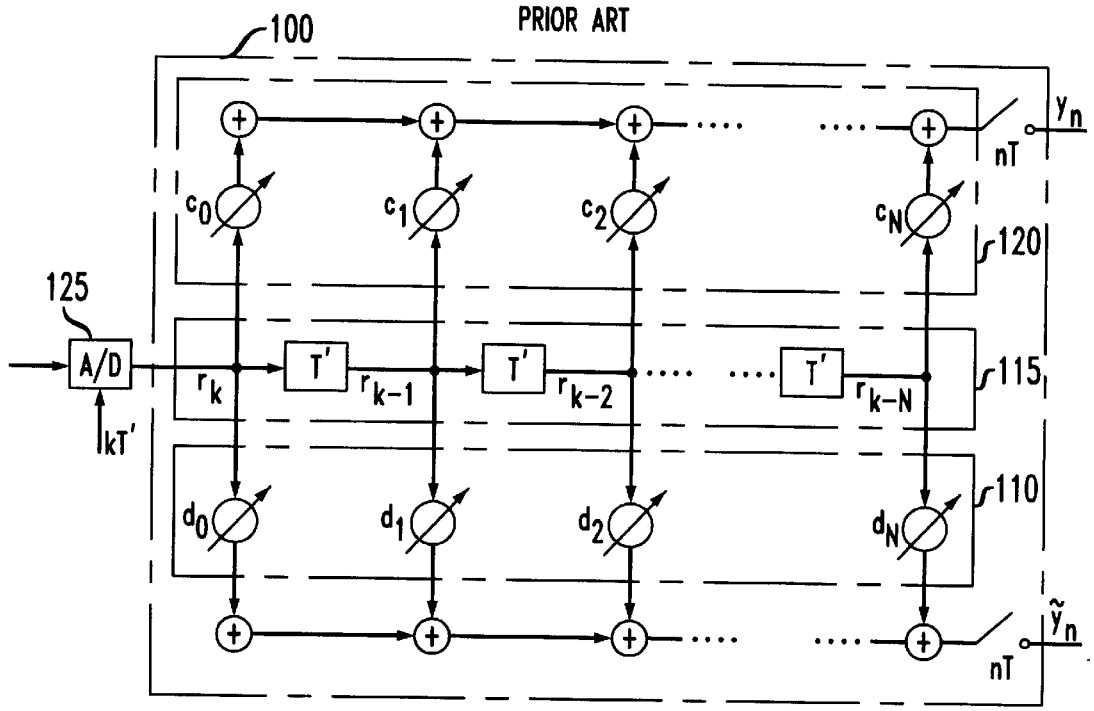
FIG. 3 is an illustrative block diagram of a portion of an adaptive filter for use in an equalizer.

An illustrative phase-splitting FSLE equalizer 100 is shown in FIG. 2. It is assumed that FSLE equalizer 100 operates on an input signal that can be characterized as having N dimensions. In this example, N=2, i.e., the input signal comprises two component dimensions: an in-phase component and a quadrature component. (It should also be noted that the term "channel" is also used herein to refer to each dimension, e.g., the in-phase dimension is also referred to as the in-phase channel.) FSLE equalizer 100 comprises two parallel digital adaptive filters implemented as finite impulse response (FIR) filters 110 and 120. Equalizer 100 is called a "phase-splitting FSLE" because the two FIR filters 110 and 120 converge to in-phase and quadrature filters. Some illustrative details of the equalizer structure are shown in FIG. 3. The two FIR filters 110 and 120 share the same tapped delay line 115, which stores sequences of successive Analog-to-Digital Converter (A/D) 125 samples $r_k$. The sampling rate 1/T' of A/D 125 is typically three to four times higher than the symbol rate 1/T and is chosen in such a way that it satisfies the sampling theorem for real signals. It is assumed that T/T'=i, where i is an integer.

The outputs of the two adaptive FIR filters 110 and 120 as shown in FIG. 3 are computed at the symbol rate 1/T. The equalizer taps and input samples can be represented by a corresponding N-dimensional vector. As such, the following relationships are now defined:

$$r_n^T=[r_k, r_{k-1}, \ldots, r_{k-N}]=\text{vector of A/D samples in delay line;} \quad (2)$$

$$C_n^T=[C_0, C_1, C_2, \ldots, C_N]=\text{vector of in-phase tap coefficients; and} \quad (3)$$

$$d^{nT}=[d_0, d_1, d_2, \ldots, d_N]=\text{vector of quadrature phase tap coefficients;} \quad (4)$$

where the superscript T denotes vector transpose, the subscript n refers to the symbol period nT, and k=(i)(n).

Let $y_n$ and $\tilde{y}_n$ be the computed outputs of the in-phase and quadrature filters, respectively, and:

$$y_n=C_n^T r_n, \text{ and} \quad (5)$$

$$\tilde{y}_n=d_n^T r_n \quad (6)$$

An X/Y display of the outputs $y_n$ and $\tilde{y}_n$ or, equivalently, of the complex output $Y_n=y_n+\tilde{J}\tilde{y}_n$, is called a signal constellation. After convergence, ideally the signal constellation consists of a display of the complex symbols $A_n=a_n+jb_n$ corrupted by some small noise and ISI.

Referring back to FIG. 2, FSLE equalizer 100 can be characterized as having two modes of operation, a normal mode (steady state) and a start-up mode (non-steady state). In the normal mode of operation, the decision devices, i.e., slicers 130 and 135, compare the equalizer complex output samples, $Y_n$, (where $Y_n=y_n+\tilde{J}\tilde{y}_n$), with all the possible transmitted complex symbols, $A_n$ (where $A_n=a_n+jb_n$), and select the symbol $\hat{A}_n$ which is the closest to $Y_n$. The receiver then computes an error, $E_n$, where:

$$E_n=Y_n-\hat{A}_n, \quad (7)$$

which is used to update the tap coefficients of equalizer 100. The most common tap updating algorithm is the LMS algorithm, which is a stochastic gradient algorithm that minimizes the mean square error (MSE), which is defined as:

$$\text{MSE} +e,dus \Delta E[|E_n|^2]=E[|Y_n-\hat{A}_n|^2]=E[e_n^2]+E[\tilde{e}_n^2]. \quad (8)$$

In equation (8), E[.] denotes expectation and $e_n$ and $\tilde{e}_n$ are the following in-phase and quadrature errors:

$$e_n=y_n-\hat{a}_n, \text{ and} \quad (9)$$

$$\tilde{e}_n=\tilde{y}_n-\hat{b}_n. \quad (10)$$

The tap coefficients of the two adaptive filters are updated using the above-mentioned least-mean-square (LMS) algorithm, i.e., $$C_{n+1}=C_n-\alpha e_n r_n, \text{ and} \quad (11)$$

$$d_{n+1}=d_n-\alpha\tilde{e}_n r_n, \quad (12)$$

where α is the step size used in the tap adjustment algorithm.

In contrast to the steady state mode of operation, the start-up mode is used to converge the tap coefficient values to an initial set of values. In some systems a training sequence is used during start-up (i.e., a predefined sequence of $A_n$ symbols), from which the receiver can compute meaningful errors $E_n$ by using the equalizer output signal $Y_n$ and the known sequence of transmitted symbols $A_n$. In this case, tap adaptation is said to be done with respect to an "ideal reference."

However, when no training sequence is available, equalizer 100 has to be converged blindly. This usually comprises two main steps. First, a blind equalization algorithm is used to open the "eye diagram." Then, once the eye is open enough, the receiver switches to, e.g., the above-described LMS tap adaptation algorithm. The philosophy of blind equalization is to use a tap adaptation algorithm that minimizes a cost function that is better suited to provide initial convergence of equalizer 100 than the MSE represented by equation (8). Two such blind equalization algorithms are the CMA algorithm and the MMA algorithm.

The CMA algorithm minimizes the following cost function (CF):

$$CF=E[(|Y_n|^L-R^L)^2], \quad (13)$$

where L is a positive integer, $Y_n$ are the equalized samples, and R is the radius of a circle. The case L=2 is the most commonly used in practice. The cost function in equation (13) is a true two-dimensional cost function which minimizes the dispersion of the equalizer complex output signal $Y_n$ with respect to a circle with radius R. The CMA algorithm provides more reliable convergence—thus avoiding incorrect diagonal solutions—but requires an expensive rotator.

In comparison, the multimodulus algorithm minimizes the following cost function:

$$CF=E[(y_n^L-R^L(Y_n))^2+(\tilde{y}_n^L-R^L(Y_n))^2], \quad (14)$$

where L is a positive integer and $R(Y_n)$ and $\tilde{R}(Y_n)$ take discrete positive values, which depend on the equalizer outputs $Y_n$. The MMA algorithm minimizes the dispersion of the equalizer output samples $y_n$ and $\tilde{y}_n$ around piecewise linear in-phase and quadrature contours.

For square constellations, $R(Y_n)=\tilde{R}(Y_n)=R=$constant, so that the cost function of equation (14) becomes:

$$CF=CF_i+CF_q=E[(y_n^L-R^L)^2+(\tilde{y}_n^L-R^L)^2]. \tag{15}$$

Unlike the cost function for CMA represented by equation (13), equation (15) is not a true two-dimensional cost function. Rather, it is the sum of two independent one-dimensional cost functions $CF_i$ and $CF_q$. For L=2, the cost functions of MMA can be represented as:

$$CF_i=E[(y_n^2-R^2)^2], \text{ and} \tag{16}$$

$$CF_q=E[(\tilde{y}_n^2-R^2)^2]. \tag{17}$$

The MMA algorithm can rotate a constellation but can sometimes converge to diagonal solutions.

Joint CMA-MMA Technique

We have discovered a technique for use in blind equalization of an adaptive equalizer that reduces the rate of occurrence of a diagonal solution. In particular, and in accordance with the invention, a receiver performs blind equalization using a joint CMA-MMA blind equalization algorithm.

The cost function of the Joint CMA-MMA algorithm is:

$$CF_i=E[(|Y_n|^2-R^2)^2], \text{ and} \tag{18}$$

$$CF_q=E[(\tilde{y}_n^2-R^2)^2]. \tag{19}$$

It should be noted that the use of either $y_n$ or $\tilde{y}_n$ in equation (19) only affects the direction of rotation but not the convergence. As such, equations (18) and (19) can also be replaced by the following:

$$CF_i=E[(y_n^2-R^2)^2], \text{ and} \tag{20}$$

$$CF_q=E[(|Y_n|^2-R^2)^2]. \tag{21}$$

For the remainder of this description of the inventive concept, it is assumed that the cost functions represented by equations (18) and (19) are used.

Figure 4:
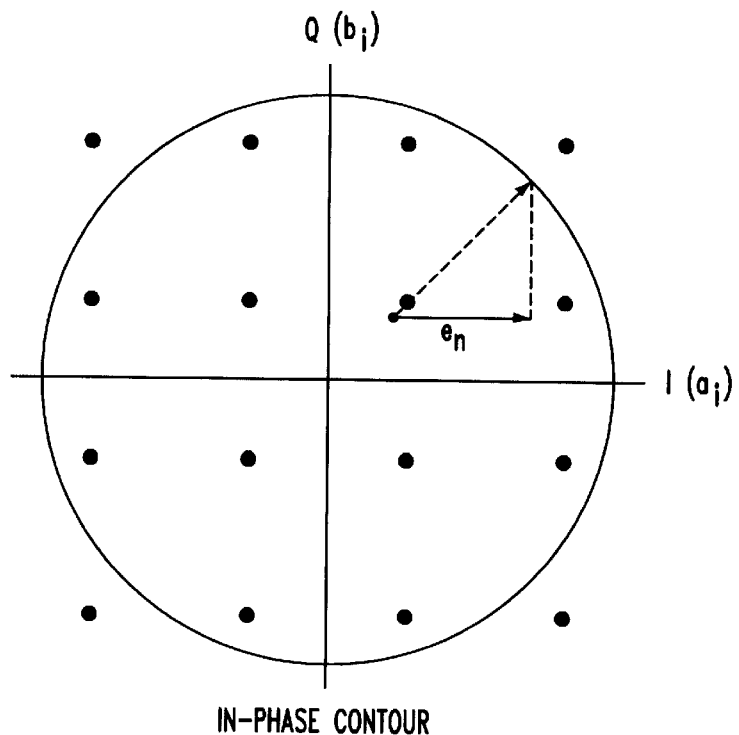
FIGS. 4 and 5 illustrate the asymmetric contours of the overall cost function in accordance with the principles of the invention.
Figure 5:
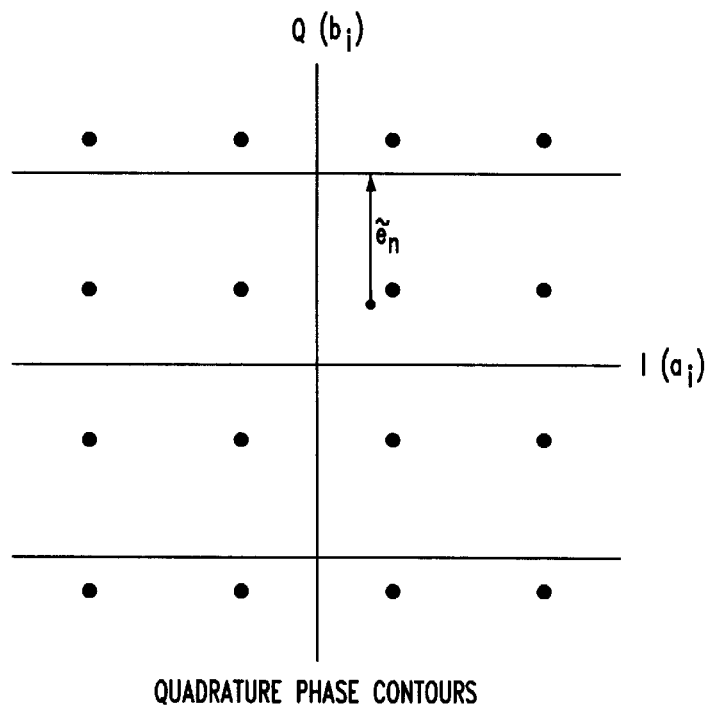

Since the inventive concept uses a combination of two-dimensional and one-dimensional cost functions, the overall cost function has asymmetric contours. In other words, the Joint CMA-MMA cost function minimization refers to two different contours as illustrated in FIGS. 4 and 5. The in-phase channel refers to a circular contour as shown in FIG. 4 and the quadrature phase channel refers to two straight lines as shown in FIG. 5.

The gradients of the cost functions are derived from equations (18) and (19) as follows:

$$\nabla_c CF_i=y_n(|Y_n|^2-R_{cma}^2)\,r_n, \text{ and} \tag{22}$$

$$\nabla_d CF_q=\tilde{y}_n(\tilde{y}_n^2-R_{mma}^2)\,r_n. \tag{23}$$

From these equations, the stochastic gradient tap updating algorithms are:

$$C_{n+1}=C_n-\mu_{cma}y_n(|Y_n|^2-R_{cma}^2)\,r_n, \text{ and} \tag{24}$$

$$d_{n+1}=d_n-\mu_{mma}\tilde{y}_n(\tilde{y}_n^2-R_{mma}^2)\,r_n. \tag{25}$$

Figure 6:
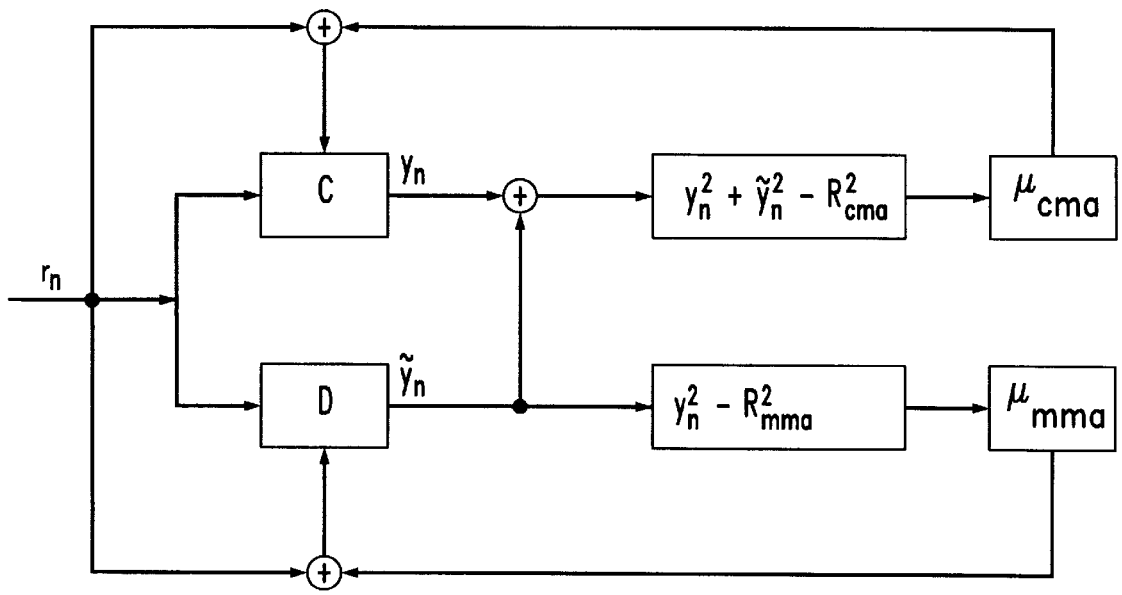
FIG. 6 shows a block diagram illustrating tap updating of a two-filter structure in accordance with the inventive concept.

Tap updating of the two-filter structure with Joint CMA-MMA is graphically illustrated in FIG. 6. Each channel uses a different error correction term, e.g., $\mu_{cma}$, and $\mu_{mma}$. As can be observed from equations (24) and (25) (and FIG. 6), a receiver, such as receiver 10 of FIG. 1, performs Joint CMA-MMA blind equalization using asymmetric algorithms for updating the tap vectors.

As noted above, the Joint CMA-MMA algorithm introduces asymmetry into the tap updating algorithm of an equalizer, whereas other blind equalization algorithms always use symmetrical algorithms for the two-filter equalizer. The asymmetries used in the Joint CMA-MMA algorithm are as follows.

Asymmetrical cost functions—the Joint CMA-MMA algorithm uses a two-dimensional algorithm for one channel and a one-dimensional algorithm for the other channel.

Different constants, $R_{cma}$ and $R_{mma}$, for the in-phase and quadrature phase channels. For example, for the cost functions represented by equations (18) and (19), the constants R are illustratively: $R_{cma}=3.6$ and $R_{mma}=2.86$ for the in-phase and quadrature channels, respectively.

Different step sizes $\mu_{cma}$, and $\mu_{mma}$. The use of different step sizes in the two cost functions further controls the rate of occurrence of diagonal solutions and the rate of convergence. However for reasonable performance these values can be equal to each other, e.g., 0.01.

The Joint CMA-MMA algorithm has different advantages compared to the CMA and MMA approaches. With respect to CMA, the Joint CMA-MMA algorithm provides for rotation of the constellation. (Rotation of a constellation by the Joint CMA-MMA algorithm can be shown mathematically. However, this proof is not necessary to the inventive concept and is not described herein.) In contrast, although the CMA algorithm provides more reliable convergence—thus avoiding incorrect diagonal solutions—CMA requires the use of an expensive rotator, which must continue to be used even in the steady-state mode of operation. With respect to MNA, the Joint CMA-MMA algorithm provides more reliable convergence than MMA because of the coupling between the two channels for tap updating (e.g., see FIG. 6). In comparison, the MMA algorithm can converge to a diagonal solution because it has two independent cost functions.

Figure 7:
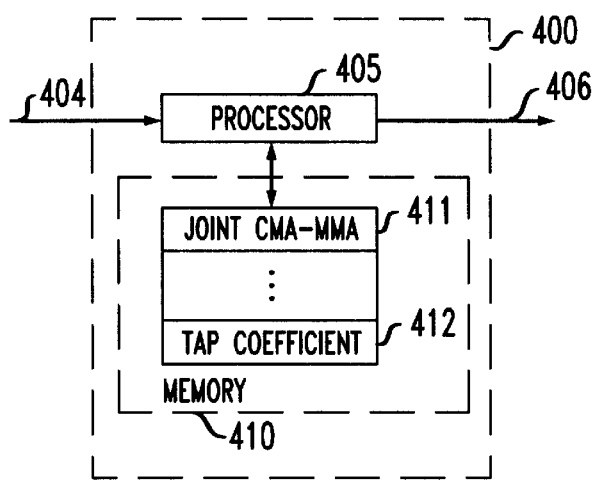
FIGS. 7 and 8 are illustrative block diagrams of a portion of a receiver embodying the principles of the invention.
Figure 8:
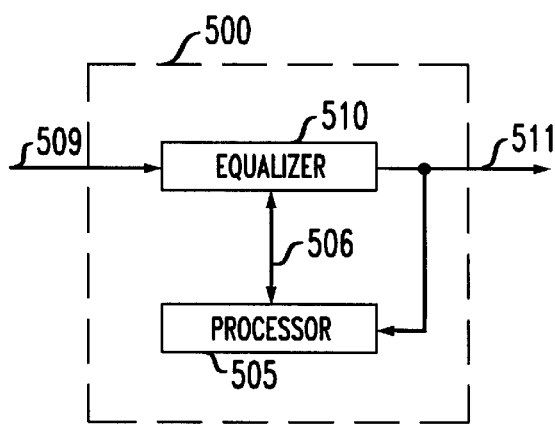

Illustrative embodiments of the inventive concept are shown in FIGS. 7 and 8 for use in receiver 10 of FIG. 1. FIG. 7 illustrates an embodiment representative of a digital signal processor 400 that is programmed to implement an FSLE in accordance with the principles of the invention. Digital signal processor 400 comprises a central processing unit (processor) 405 and memory 410. A portion of memory 410 is used to store program instructions that, when executed by processor 405, implement the Joint CMA-MMA algorithm. This portion of memory is shown as 411. Another portion of memory, 412, is used to store tap coefficient values that are updated by processor 405 in accordance with the inventive concept. It is assumed that a received signal 404 is applied to processor 405, which equalizes this signal in accordance with the inventive concept to provide a output signal 406. For the purposes of example only, it is assumed that output signal 406 represents a sequence of output samples of an equalizer. (As known in the art, a digital signal processor may, additionally, further process received signal 404 before deriving output signal 406.) An illustrative software program is not described herein since, after learning of the Joint CMA-MMA algorithm as described herein, such a program is within the capability of one skilled in the art. Also, it should be noted that any equalizer structures, such as that described earlier, can be implemented by digital signal processor 400 in accordance with the inventive concept.

FIG. 8 illustrates another alternative embodiment of the inventive concept. Circuitry 500 comprises a central processing unit (processor) 505, and an equalizer 510. The latter is illustratively assumed to be a phase-splitting FSLE as described above. It is assumed that equalizer 510 includes at least one tap-coefficient register for storing values for corresponding tap coefficient vectors (e.g., as shown in FIG. 3). Processor 505 includes memory, not shown, similar to memory 410 of FIG. 7 for implementing the Joint CMA-NIMA algorithm. Equalizer output signal 511, which represents a sequence of equalizer output samples, is applied to processor 505. The latter analyzes equalizer output signal 511, in accordance with the inventive concept, to adapt values of the tap coefficients in such a way as to converge to a correct solution.

Figure 9:
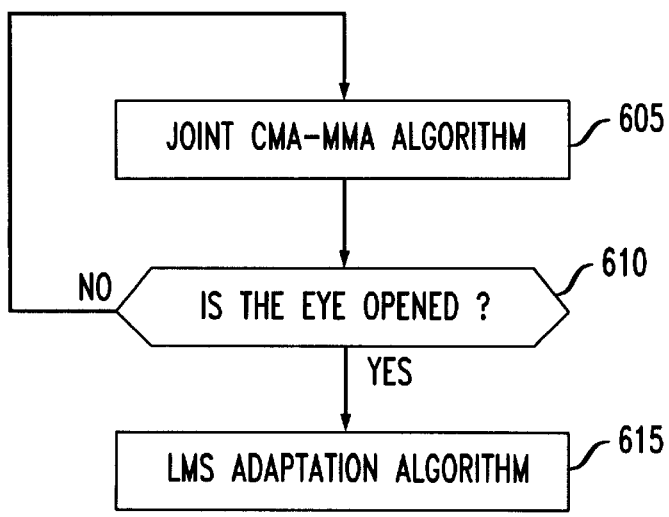
FIG. 9 shows an illustrative blind start-up procedure in accordance with the principles of the invention.

A blind start-up procedure in accordance with the principles of the invention for use in receiver 10 of FIG. 1 is shown in FIG. 9. In step 605, receiver 10 uses the Joint CMA-MMA cost function with its corresponding tap updating algorithms to begin blind convergence of an equalizer, e.g., equalizer 510 of FIG. 8. In step 610, a decision is made whether to switch from the Joint CMA-MMA algorithm to the LMS adaptation algorithm or to continue using the Joint CMA-MMA algorithm to converge the equalizer. Typically, this is referred to in the art as determining if the eye is open enough (as noted above). Step 610 of the blind start-up procedure can be schedule-driven, event-driven, or both. With a schedule-driven approach, the switch between two different tap updating algorithms occurs after some fixed number, M, of iterations (which can be determined by a counter, for example). This approach presumes a certain amount of eye-opening after M iterations. With an event-driven approach, the switch occurs when a certain quality of eye opening is achieved. This can be done, for example, by continuously monitoring the MSE and making the switch when the MSE is below some threshold T. If the eye has been opened enough, receiver 10 switches to the LMS Adaptation algorithm in step 615.

The foregoing merely illustrates the principles of the invention and it will thus be appreciated that those skilled in the art will be able to devise numerous alternative arrangements which, although not explicitly described herein, embody the principles of the invention and are within its spirit and scope. For example, although the inventive concept was illustrated herein as being implemented with discrete functional building blocks, e.g., equalizer 510, etc., the functions of any one or more of those building blocks can be carried out using one or more appropriately programmed processors or processing circuitry, e.g., a digital signal processor; discrete circuit elements; integrated circuits; etc.

What is claimed:

1. An improved method for performing blind equalization in a receiver, the improvement comprising:
    using a joint constant modulus algorithm-multimodulus algorithm (CMA-MMA) to perform the blind equalization.

2. The improved method of claim 1 further operating on an N-dimensional signal and wherein the using step includes the step of using a constant modulus based algorithm on one channel of the N-dimensional signal and using a multimodulus based algorithm on another channel of the N-dimensional signal.

3. The improved method of claim 1 further operating on an N-dimensional signal and wherein the using step includes the step of using at least two different tap updating algorithms for use in processing the N-dimensional signal.

4. The improved method of claim 3 wherein one tap updating algorithm is a lower-dimensional algorithm than the other tap updating algorithm.

5. The improved method of claim 4 wherein one tap updating algorithm is a one dimensional algorithm and the other tap updating algorithm is a two dimensional algorithm.

6. A method for use in a receiver for adapting tap coefficient vectors, the method comprising the steps of:
    processing an N-dimensional signal,
    using a constant modulus based algorithm to adapt a first tap coefficient vector, the first tap coefficient vector being used for processing one of the dimensions of the N-dimensional signal; and
    using a multimodulus based algorithm to adapt a second tap coefficient vector, the second tap coefficient vector being used for processing another of the dimensions of the N-dimensional signal.

7. A method for use in a communications receiver, the method comprising the steps of:
    using an adaptive filter structure for processing a received signal, the adaptive filter structure including N tap coefficient vectors; and
    blindly converging at least two of the N tap coefficient vectors by using asymmetric convergence algorithms
        wherein the blindly converging step includes the steps of: using a constant modulus based algorithm to adapt one of the tap coefficient vectors; and
        using a multimodulus based algorithm to adapt the second tap coefficient vector.

8. A method for use in a communications receiver, the method comprising the steps of:
    using a two-filter structure for adaptively filtering a received signal, each filter having a corresponding set of tap coefficient values; and
    using asymmetric tap adaptation algorithms for updating each set of tap coefficient values
        wherein one tap adaptation algorithm is based on a constant modulus algorithm and the other tap adaptation algorithm is based on a multimodulus based algorithm.

9. The method of claim 8 wherein the two-filter structure is a fractionally-spaced linear equalizer.

10. A method for use in performing blind equalization in a receiver, the method comprising the steps of:
    (a) blindly converging a filter having N tap coefficient vectors by using at least two different blind equalization algorithms for two of the N tap coefficients vectors; and
    (b) subsequently switching to a least mean square based adaptation algorithm
        wherein step (a) is performed until a predetermined amount of time passes, upon which step (b) is performed.

11. A method for use in performing blind equalization in a receiver, the method comprising the steps of:
    (a) blindly converging a filter having N tap coefficient vectors by using at least two different blind equalization algorithms for two of the N tap coefficients vectors; and
    (b) subsequently switching to a least mean square based adaptation algorithm
        wherein step (a) includes the step of using different tap adaptation algorithms for the two tap coefficient vectors and wherein one tap adaptation algorithm is based on a constant modulus algorithm and the other tap adaptation algorithm is based on a multimodulus based algorithm.

12. An improved equalizer for use in a receiver for performing blind equalization; the improvement comprising:

a processor a) for providing an equalizer function for equalizing a received signal, and b) for adapting two coefficient vectors of the equalizer function by using at least two different blind equalization based tap updating algorithms
  wherein one blind equalization based tap updating algorithm is a constant modulus based algorithm and the other blind equalization based tap updating algorithm is a multimodulus based algorithm.

13. The improvement of claim 12 wherein the processor is a digital signal processor.

14. An improved adaptive filter for performing blind equalization in a receiver, the improvement comprising:
  an adaptive filter having a two-filter structure, where each of the two filters further comprises a respective set of tap coefficient values, and wherein each set of tap coefficient values is adapted in accordance with a different adaptation algorithm
    wherein one adaptation algorithm is based on a constant modulus based algorithm and the other tap adaptation algorithm is based on a multimodulus based algorithm.

15. Apparatus for use in performing blind equalization in a receiver, the apparatus comprising:
  a memory for storing a transition algorithm for performing blind equalization and for storing N tap coefficient vectors; and
  a processor a) for filtering an input signal as a function of the N stored tap coefficient vectors to provide an output signal, and b) for executing the transition algorithm to blindly adapt the N stored tap coefficient vectors such that at least two of the tap coefficient vectors are adapted by using asymmetrical cost functions
    wherein one cost function is representative of a constant modulus based cost function and the other cost function is representative of a multimodulus based cost function.

16. Apparatus for use in a receiver, the apparatus comprising:
  an equalizer having N tap coefficient vectors and for providing an equalized version of an applied input signal; and
  a processor for blindly adapt the N tap coefficient vectors such that at least two of the tap coefficient vectors are adapted by using different adaptation functions
    wherein one adaptation function is representative of a constant modulus based algorithm and the other adaptation function is representative of a multimodulus based algorithm.

17. Apparatus for use in a receiver, the apparatus comprising:
  an adaptive filter having a two-filter structure, where each of the two filters further comprises a respective set of tap coefficient values; and
  circuitry for adapting each set of tap coefficient values in accordance with asymmetric tap updating functions
    wherein one tap updating function is a constant modulus based algorithm and the other tap updating function is a multimodulus based algorithm.

* * * * *